Patented July 8, 1924.

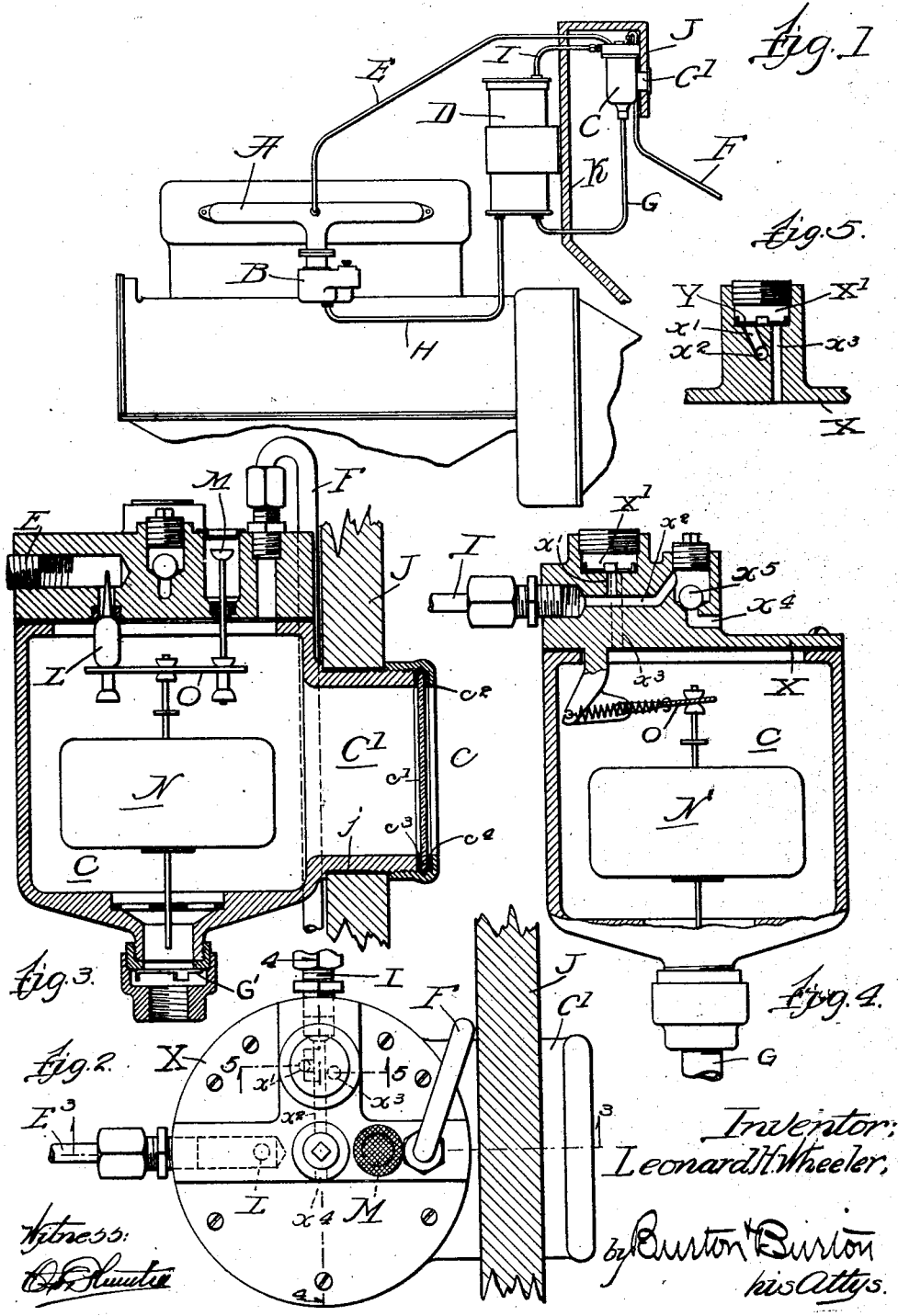

1,500,429

UNITED STATES PATENT OFFICE.

LEONARD H. WHEELER, OF CHICAGO, ILLINOIS, ASSIGNOR TO STEWART-WARNER SPEEDOMETER CORPORATION, OF CHICAGO, ILLINOIS, A CORPORATION OF VIRGINIA.

VISIBLE-FLOW FUEL-FEEDING DEVICE FOR AUTOMOBILE ENGINES.

Application filed July 19, 1922. Serial No. 576,006.

*To all whom it may concern:*

Be it known that I, LEONARD H. WHEELER, a citizen of the United States, residing in the city of Chicago, in the county of Cook and the State of Illinois, have invented certain new and useful Improvements in Visible-Flow Fuel-Feeding Devices for Automobile Engines, of which the following is a specification, reference being had to the accompanying drawings, forming a part thereof.

The purpose of this invention is to provide an improved construction of a fuel feeding device for the engine of a motor vehicle, particularly adapted for enabling the driver at all times to observe the fact and rate of supply of fuel to the engine. It consists in the elements and features of construction shown and described, as indicated in the claims.

In the drawings:—

Figure 1 is a diagrammatic view showing a portion of an automobile and its engine equipped with a fuel feed device embodying this invention.

Figure 2 is a top plan view of the fuel feeding device embodying the invention.

Figure 3 is a section at the line, 3—3, on Figure 2.

Figure 4 is a section at the line, 4—4, on Figure 2.

Figure 5 is a section at the line, 5—5, on Figure 3.

In the drawing, A indicates the intake manifold of the engine; B is the carbureter. C is the vacuum chamber of a vacuum fuel feed device; D is the fuel reserve or storage chamber pertaining to the same; E is a pipe leading from the manifold, A, to the vacuum chamber, C, for producing partial vacuum therein for the purpose of lifting the fuel from a low tank (not shown), by way of the pipe, F, which discharges the fuel into the top of the vacuum chamber, C. G is the delivery pipe from the vacuum chamber, C, to the reserve or storage chamber, D. $G^1$ is a check valve controlling the outflow from chamber C, said valve being held seated so long as the suction is operative to produce a partial vacuum in said chamber C, and opening to permit outflow of liquid from said chamber when the suction is interrupted and atmospheric pressure obtains in the chamber C. H is the delivery pipe from the storage chamber, D, into the carbureter, B. I is a pipe which constitutes a connection from the upper part of the storage chamber, D, to the cap plate, X, of the chamber, C, primarily for admitting atmospheric pressure to the chamber, D, to permit the delivery of the liquid fuel by gravity therefrom to the carbureter, and secondarily, for making connection also with the vacuum chamber, C, for a purpose and in a manner hereinafter described. The storage or reserve fuel chamber, D, is mounted in any usual or convenient position, as upon the forward side of the dash board, K. The vacuum chamber, C, instead of being a part of a unitary structure with the reserve chamber, D, is made as a separate receptacle, adapted to be mounted, and shown as mounted, upon the cowl or instrument board of the vehicle, indicated at J. The purpose of positioning the vacuum chamber as stated, is that it may be within the view of the driver of the vehicle; and in order that the driver may be able to observe at all times the operation of the device as to the inflow, outflow and liquid level of the liquid fuel, the receptacle, C, is provided with a rearwardly projecting extension, $C^1$, designed to protrude through an aperture, $j$, to be provided in the cowl or instrument board, J, and having its rear side formed by a glass panel, $c^1$, secured liquid-tight over the otherwise open side of said extension, $C^1$, by a bezel, $c^2$, said extension being preferably cylindrical and exteriorly threaded at its rear end for receiving the bezel correspondingly interiorly threaded for clamping the transparent panel, $c^1$, tightly into position between proper gaskets, $c^3$, $c^4$. The vacuum chamber, C, has the customary suction controlling valve, L, atmosphere valve, M, valve-operating float, N, and the familiar lever snap action, O, connecting the float with the valves for operating both valves to alternate the dominance of suction and atmospheric pressure in the vacuum chamber, for the well understood purpose of this class of devices.

The vacuum chamber being separated from the reserve or storage chamber, and being located at the level necessary for bringing the sight panel, $c^1$, at the proper position to enable the driver to observe the operation of the device as to inflow, outflow and liquid level, as intended, would naturally be at a higher level than it would occupy in the customary position as part of the unitary structure with the tank, D. And when thus located, as shown in the drawings, it will be seen that the tank, D, may become filled with liquid to the top, its upper end being below the high liquid level of the vacuum chamber, C. This distribution of the two chambers, therefore, defeats the provision of expansion space which is provided in the customary form of vacuum tank construction, which is obtained in the annular space between the two chambers when the vacuum chamber is suspended within the other chamber. It becomes necessary, therefore, to provide other means for preventing the danger of blowing out of combustible fuel through the atmosphere vent of the lower chamber, under conditions causing expansion of the liquid therein after that chamber is full. For that purpose there is provided in the cap plate, X, in which all the inlet and outlet connections of the chamber, C, except its discharge connection to the pipe, G, are made, a valve chamber, $X^1$; which is part of a conduit leading from the cavity of the chamber, C, to the atmosphere inlet duct, $x^2$, with which the pipe, I, is connected for making the atmosphere inlet or vent passage for the lower chamber, D. The two ports of this valve chamber which lead respectively to the atmosphere inlet and to the chamber, C, are in the same bottom wall of the valve chamber, so that they are both closed by one and the same movement of the valve, Y, therein, said valve being adapted to seat by gravity to close both the ports. From this construction it will be seen that it will result that either atmospheric pressure reaching the valve, Y, through the passages, $x^1$ and $x^2$, or pressure caused by any means in the chamber, D, reaching said valve, Y, through passages, $x^1$ and $x^2$, will lift the valve from its seat, and thereby establish communication between said chamber, $X^1$, and the atmosphere inlet, $x^4$; but that the suction operating in the chamber, C, or, if that were possible, in the chamber, D, will seat the valve over both ports. When, therefore, the device is operating normally, and the suction valve, L, is open, producing partial vacuum in the chamber, C, this suction is not transmitted to the chamber, D, because the suction causes the valve, Y, to be seated. But when, on the other hand, pressure is produced in the chamber, D, by the expansion of the liquid fuel therein, although this pressure operates in the same direction as the suction which might be communicated from the chamber, C, it will open the valve, Y, instead of closing it, and will permit the expansion of the liquid to take place through the pipe, I, duct, $x^1$ and ducts, $x^2$, and $x^3$, for delivery of the liquid into the chamber, C. In order to prevent such expansion from alternatively or with probability, causing discharge of the expanding fuel to the atmosphere inlet port, $x^4$, a check valve, $x^5$, is interposed between said port, $x^4$, and the junction of the port, $x^3$, with the ducts of the passage, $x^3$, with the passage, $x^1$. The check valve, it will be observed, opening inwardly, permits the free access of atmospheric pressure to the chamber, D, to permit the delivery of liquid fuel by gravity from the carbureter, as is necessary.

I claim:—

1. In combination with a motor vehicle and its engine, a fuel feeding device comprising a chamber into which fuel is moved from a lower source on the vehicle, said chamber having a transparent panel through which the interior conditions as to inflow, outflow and liquid level, can be observed; a fuel supply conduit leading to said chamber; means for causing inflow of fuel therethrough to the chamber, said chamber having an atmosphere inlet for permitting garvity outflow from the chamber; means operating by change of liquid level in the chamber, for alternating the operation of the inflow causing means and the atmosphere pressure for permitting outflow; a fuel reserve chamber positioned at a lower level than the first mentioned chamber and at a level for supplying the carbureter by gravity flow; a conduit for delivering the liquid by gravity from the first mentioned chamber to the second; a valve controlling liquid flow to said conduit, adapted to be opened in the direction of outflow from the first chamber toward the second, and to be held seated by the means for causing liquid inflow into said first chamber, said second chamber having a constantly open air inlet for permitting gravity outflow therefrom to the carbureter.

2. In the construction defined in claim 1, foregoing, the first mentioned chamber having a laterally projecting extension of said chamber whose vertical extent comprises both the high and the low level limit at which the change from inflow to outflow and from outflow to inflow occur, the transparent panel being in one side of said lateral extension; whereby said device is adapted to be mounted on the instrument board or the like of the vehicle with said transparent paneled side of the extension projecting through the board, and the chamber having such extension situated in front of said board.

3. In the construction defined in claim 1, foregoing, a passage connecting the air inlet passage of the second chamber with the first chamber, comprising a valve chamber with a port leading to the atmosphere and a port leading to said second chamber; a valve in said chamber adapted to be seated by one and the same movement at both said ports, and a check valve in said air inlet passage between the atmosphere end thereof and said connection with the passage leading to said double-ported valve chamber.

In testimony whereof, I have hereunto set my hand at Chicago, Illinois, this 15th day of July, 1922.

LEONARD H. WHEELER.